(12) United States Patent
Mizutani et al.

(10) Patent No.: US 11,209,388 B2
(45) Date of Patent: Dec. 28, 2021

(54) GAS SENSOR

(71) Applicant: DENSO CORPORATION, Kariya (JP)

(72) Inventors: Keisuke Mizutani, Nisshin (JP); Keigo Mizutani, Nisshin (JP); Shota Hagino, Nisshin (JP); Mitsunobu Nakato, Kariya (JP); Takashi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 261 days.

(21) Appl. No.: 16/313,551

(22) PCT Filed: May 15, 2017

(86) PCT No.: PCT/JP2017/018249
§ 371 (c)(1),
(2) Date: Dec. 27, 2018

(87) PCT Pub. No.: WO2018/003326
PCT Pub. Date: Jan. 4, 2018

(65) Prior Publication Data
US 2019/0227027 A1    Jul. 25, 2019

(30) Foreign Application Priority Data
Jun. 29, 2016  (JP) .............................. JP2016-128761

(51) Int. Cl.
*G01N 27/419*  (2006.01)
*G01N 27/416*  (2006.01)
(Continued)

(52) U.S. Cl.
CPC ......... *G01N 27/419* (2013.01); *F01N 13/008* (2013.01); *G01N 27/4076* (2013.01);
(Continued)

(58) Field of Classification Search
CPC .............. G01N 27/419; G01N 27/416; G01N 27/4076; G01N 27/41; G01N 27/406–41; G01N 33/0004–0075; F01N 2560/026
See application file for complete search history.

(56) References Cited

U.S. PATENT DOCUMENTS

2001/0025789 A1* 10/2001 Miyashita ............ G01N 27/419
204/431
2003/0205078 A1* 11/2003 Hasei ................. G01N 27/4074
73/23.31
(Continued)

FOREIGN PATENT DOCUMENTS

JP    2002-340845        11/2002
JP    2002340845 A    *   11/2002

OTHER PUBLICATIONS

Enmei et al. (JP 2002340845 A, machine translation) (Year: 2003).*

*Primary Examiner* — Joshua L Allen
(74) *Attorney, Agent, or Firm* — Nixon & Vanderhye P.C.

(57) ABSTRACT

The present invention provides a gas sensor capable of suppressing a variation of a sensor output by a sensor cell to be small. A sensor element of a gas sensor comprises a first solid electrolyte body and a second solid electrolyte body having oxygen ion conductivity, a measured gas chamber into which the measured gas is introduced, a first reference gas chamber and a second reference gas chamber into which reference gas is introduced, a first pump cell, a second pump cell, a sensor cell, and a heater. A value obtained by dividing a first average cross-sectional area of the first reference gas chamber by the first length is larger than the value obtained by dividing the second average cross-sectional area of the second reference gas chamber by the second length.

12 Claims, 11 Drawing Sheets

(51) Int. Cl.
*F01N 13/00* (2010.01)
*G01N 27/407* (2006.01)
*G01N 27/41* (2006.01)

(52) U.S. Cl.
CPC ........... *G01N 27/41* (2013.01); *G01N 27/416* (2013.01); *F01N 2560/026* (2013.01)

(56) References Cited

U.S. PATENT DOCUMENTS

| | | | |
|---|---|---|---|
| 2004/0000479 A1* | 1/2004 | Katafuchi | G01N 27/419 204/424 |
| 2004/0069629 A1* | 4/2004 | Tanaka | G01N 27/419 204/424 |
| 2007/0221499 A1* | 9/2007 | Katafuchi | G01N 27/4071 204/424 |
| 2013/0092537 A1* | 4/2013 | Mizutani | G01N 27/419 204/427 |

* cited by examiner

GAS SENSOR

CROSS-REFERENCE TO RELATED APPLICATION

This application is the U.S. national phase of International Application No. PCT/JP2017/018249 filed May 15, 2017 which designated the U.S. and claims priority to Japanese Patent Application No. 2016-128761 filed Jun. 29, 2016, the contents of which are incorporated herein by reference.

TECHNICAL FIELD

The present disclosure relates to a gas sensor for measuring concentration of a specific gas component in a measured gas.

BACKGROUND ART

An exhaust system of an internal combustion engine employs a gas sensor which measures concentration of a specific gas component, such as oxygen and nitrogen oxide, in exhaust gas as measured gas.

For example, a sensor element of a gas sensor described in Patent Literature 1 includes two solid electrolyte bodies having oxygen ion conductivity, a measured gas chamber formed between two solid electrolyte bodies and into which measured gas is introduced, two reference gas chambers formed adjacent to each solid electrolyte body and into which reference gas is introduced, and a heater disposed facing the outside of the solid electrolyte body.

Each of the solid electrolyte bodies is provided with a pump cell for adjusting oxygen concentration in the measured gas chamber, and each of the solid electrolyte bodies is provided with a sensor cell for measuring the specific gas component in the measured gas, disposed further downstream to the location of each pump cell in the flow direction of the measured gas. In each of the pump cells, oxygen unnecessary for measuring the specific gas component in the sensor cell is discharged to each reference gas chamber. In the sensor cell, a current of oxygen ions conducting through the solid electrolyte body is output as a sensor output in accordance with concentration of the specific gas component.

CITATION LIST

Patent Literature

[PTL1] JP 2013-88119 A

SUMMARY OF THE INVENTION

Incidentally, in the gas sensor having the structure shown in Patent Literature 1 or the like, as a result of intensive research by the inventors, it has been found that when rich gas is introduced as the measured gas when the air-fuel ratio of the internal combustion engine is on the richer side than the stoichiometric air-fuel ratio, the difference between the volume of the reference gas chamber adjacent to the first solid electrolyte body in which the sensor cell is provided and the volume of the reference gas chamber adjacent to the second solid electrolyte body in which the sensor cell is not provided influences the sensor output by the sensor cell. The reason for this is considered to be that when rich gas is introduced into the gas sensor, a difference occurs between the amount of movement of oxygen ions in the first solid electrolyte body provided with the sensor cell and the amount of movement of oxygen ions in the second solid electrolyte body not provided with the sensor cell.

In the gas sensor of Patent Literature 1, the volume of the reference gas chamber adjacent to the first solid electrolyte body in which the sensor cell is provided is equal to the volume of the reference gas chamber adjacent to the second solid electrolyte body in which the sensor cell is not provided. According to the present inventors, it has been found that, if the volumes of the two reference gas chambers are not adequately controlled, a variation of the sensor output by the sensor cell becomes difficult to suppress when rich gas is introduced.

It is an object of the present disclosure to provide a gas sensor capable of suppressing a variation of the sensor output by the sensor cell to be small.

An aspect of the present disclosure is a gas sensor including a sensor element for measuring concentration of a specific gas component in measured gas containing oxygen. The sensor element includes a measured gas chamber into which the measured gas is introduced; a first reference gas chamber and a second reference gas chamber into which reference gas is introduced; a plate-shaped first solid electrolyte body having oxygen ion conductivity, disposed between the first reference gas chamber and the measured gas chamber, and having a first principal surface facing the first reference gas chamber, and a second principal surface facing the measured gas chamber; a second solid electrolyte body having oxygen ion conductivity, disposed facing the first reference gas chamber via the measured gas chamber, and having a first principal surface facing the first reference gas chamber and a second principal surface facing the second measured gas chamber; a first pump cell including a first reference electrode formed on the first principal surface of the first solid electrolyte body, a first pump electrode formed on the second principal surface of the first solid electrolyte body, and a part of the first solid electrolyte body sandwiched between the first reference electrode and the first pump electrode, and the first pump cell adjusting oxygen concentration in the measured gas chamber by passing current between the first reference electrode and the first pump electrode; a second pump cell including a second pump electrode formed on the first principal surface of the second solid electrolyte body, a second reference electrode formed on the second principal surface of the second solid electrolyte body, and a part of the second solid electrolyte body sandwiched between the second pump electrode and the second reference electrode, and the second pump cell adjusting oxygen concentration in the measured gas chamber by passing current between the second reference electrode and the second pump electrode; a sensor cell including a third reference electrode formed on the first principal surface of the first solid electrolyte body, a sensor electrode formed further downstream to the first pump cell in the flow direction of the measured gas on the second principal surface of the first solid electrolyte body, and a part of the first solid electrolyte body sandwiched between the third reference electrode and the sensor electrode, and the sensor cell measuring a specific gas component in measured gas whose oxygen concentration has been adjusted by each of the pump cells, based on the current passed between the third reference electrode and the sensor electrode; and a heater disposed facing the first principal surface of the first solid electrolyte body or the second principal surface of the second solid electrolyte body.

A value obtained by dividing a first cross-sectional area by a first length, the first cross-sectional area being orthogonal to the flow direction in the first reference gas chamber, the first length being in the flow direction in the first reference gas chamber, is larger throughout the length of the first reference gas chamber and the second reference gas chamber in the flow direction than a value obtained by dividing a second cross-sectional area by a second length, the second cross-sectional area being orthogonal to the flow direction in the second reference gas chamber, the second length being in the flow direction in the second reference gas chamber.

A second aspect of the present disclosure is a gas sensor including a sensor element for measuring concentration of a specific gas component in measured gas containing oxygen. The sensor element includes a measured gas chamber into which the measured gas is introduced; a first reference gas chamber and a second reference gas chamber into which reference gas is introduced; a plate-shaped first solid electrolyte body having oxygen ion conductivity, disposed between the first reference gas chamber and the measured gas chamber, and having a first principal surface facing the first reference gas chamber, and a second principal surface facing the measured gas chamber; a second solid electrolyte body having oxygen ion conductivity, disposed facing the first reference gas chamber via the measured gas chamber, and having a first principal surface facing the first reference gas chamber and a second principal surface facing the second measured gas chamber; a first pump cell including a first reference electrode formed on the first principal surface of the first solid electrolyte body, a first pump electrode formed on the second principal surface of the first solid electrolyte body, and a part of the first solid electrolyte body sandwiched between the first reference electrode and the first pump electrode, and the first pump cell adjusting oxygen concentration in the measured gas chamber by passing current between the first reference electrode and the first pump electrode; a second pump cell including a second pump electrode formed on the first principal surface of the second solid electrolyte body, a second reference electrode formed on the second principal surface of the second solid electrolyte body, and a part of the second solid electrolyte body sandwiched between the second pump electrode and the second reference electrode, and the second pump cell adjusting oxygen concentration in the measured gas chamber by passing current between the second reference electrode and the second pump electrode; a sensor cell including a third reference electrode formed on the first principal surface of the first solid electrolyte body, a sensor electrode formed further downstream to the first pump cell in the flow direction of the measured gas on the second principal surface of the first solid electrolyte body, and a part of the first solid electrolyte body sandwiched between the third reference electrode and the sensor electrode, and the sensor cell measuring a specific gas component in measured gas whose oxygen concentration has been adjusted by each of the pump cells, based on the current passed between the third reference electrode and the sensor electrode; and a heater disposed facing the first principal surface of the first solid electrolyte body or the second principal surface of the second solid electrolyte body.

A value obtained by dividing a first average cross-sectional area by a first length, the first average cross-sectional area being orthogonal to the flow direction in the first reference gas chamber, the first length being in the flow direction in the first reference gas chamber, is larger than a value obtained by dividing a second average cross-sectional area by a second length, the second average cross-sectional area being orthogonal to the flow direction in the second reference gas chamber, the second length being in the flow direction in the second reference gas chamber, and the thickness in the stacking direction of the first solid electrolyte body and the second solid electrolyte body throughout the length in the flow direction in the first reference gas chamber is larger than the thickness in the stacking direction throughout the length in the flow direction in the second reference gas chamber.

Advantageous Effects of the Invention

In the sensor element of the gas sensor, when two pump cells are formed using two solid electrolyte bodies, the sensor output by the sensor cell is configured to be stabilized.

Specifically, the value of the sensor output in the first reference gas chamber facing the first principal surface of the first solid electrolyte body in which the sensor cell is provided is larger than the value of the sensor output in the second reference gas chamber facing the second principal surface of the second solid electrolyte body in which the sensor cell is not provided. Here, each value is a scale indicating the ease of introducing the reference gas into each reference gas chamber. Each value increases as the average cross-sectional area of each reference gas chamber increases, and decreases as the length of each reference gas chamber increases. The larger each value is, the easier it is to introduce the reference gas into each reference gas chamber.

According to the configuration of the sensor element, when a so-called rich gas is introduced into the measured gas chamber as measured gas, it is possible to prevent a decrease in oxygen concentration in the first reference gas chamber facing the first principal surface of the first solid electrolyte body provided with the sensor cell. As a result, even when measured gas introduced into the gas sensor fluctuates between rich gas and lean gas, it is possible to suppress fluctuation from occurring in the sensor output when concentration of the specific gas component is measured by the sensor cell.

The reason why the variation of the sensor output can be suppressed to a small value due to the configuration of the sensor element is not necessarily clear, but the following can be considered. When a rich gas containing CO, HC, $H_2$, or the like is introduced into the measured gas chamber, oxygen is supplied from the first reference gas chamber and the second reference gas chamber to the measured gas chamber by the first pump cell and the second pump cell in order to convert CO and HC in the rich gas into $CO_2$ and $H_2O$. Then, oxygen concentration in the first reference gas chamber and the second reference gas chamber tends to decrease. At this time, when oxygen concentration in the first reference gas chamber decreases, the potential of the third reference electrode fluctuates and the sensor output fluctuates.

In the sensor cell, the decomposition of NOx and the electrolysis of $H_2O$ may be performed. In this instance, in the first solid-state electrolyte, oxygen ions at the time of NOx decomposition and oxygen ions at the time of $H_2O$ decomposition are conducted from the measuring gas chamber to the first reference gas chamber. At this time, if oxygen concentration in the first reference gas chamber is lowered, it is considered that the electrolysis of the $H_2O$ is promoted. Therefore, in the sensor element, the value in the first reference gas chamber is made larger than the value in the second reference gas chamber, thereby preventing a decrease in oxygen concentration in the first reference gas chamber. With this configuration, it is considered that the variation of the potential of the third reference electrode is minimized, the electrolysis of the $H_2O$ in the sensor cell is prevented, and the variation of the sensor output by the sensor cell is kept minimized.

As described above, the gas sensor suppresses the variation of the sensor output by the sensor cell.

BRIEF DESCRIPTION OF THE DRAWINGS

The above object, the other objects, and features and advantages of the present disclosure will become clearer from the following detailed description with reference to the accompanying drawings. The drawings are described as follows.

DESCRIPTION OF THE EMBODIMENTS

First Embodiment

The following describes embodiments of the gas sensor with reference to FIGS. 1 to 9.

Figure 1:
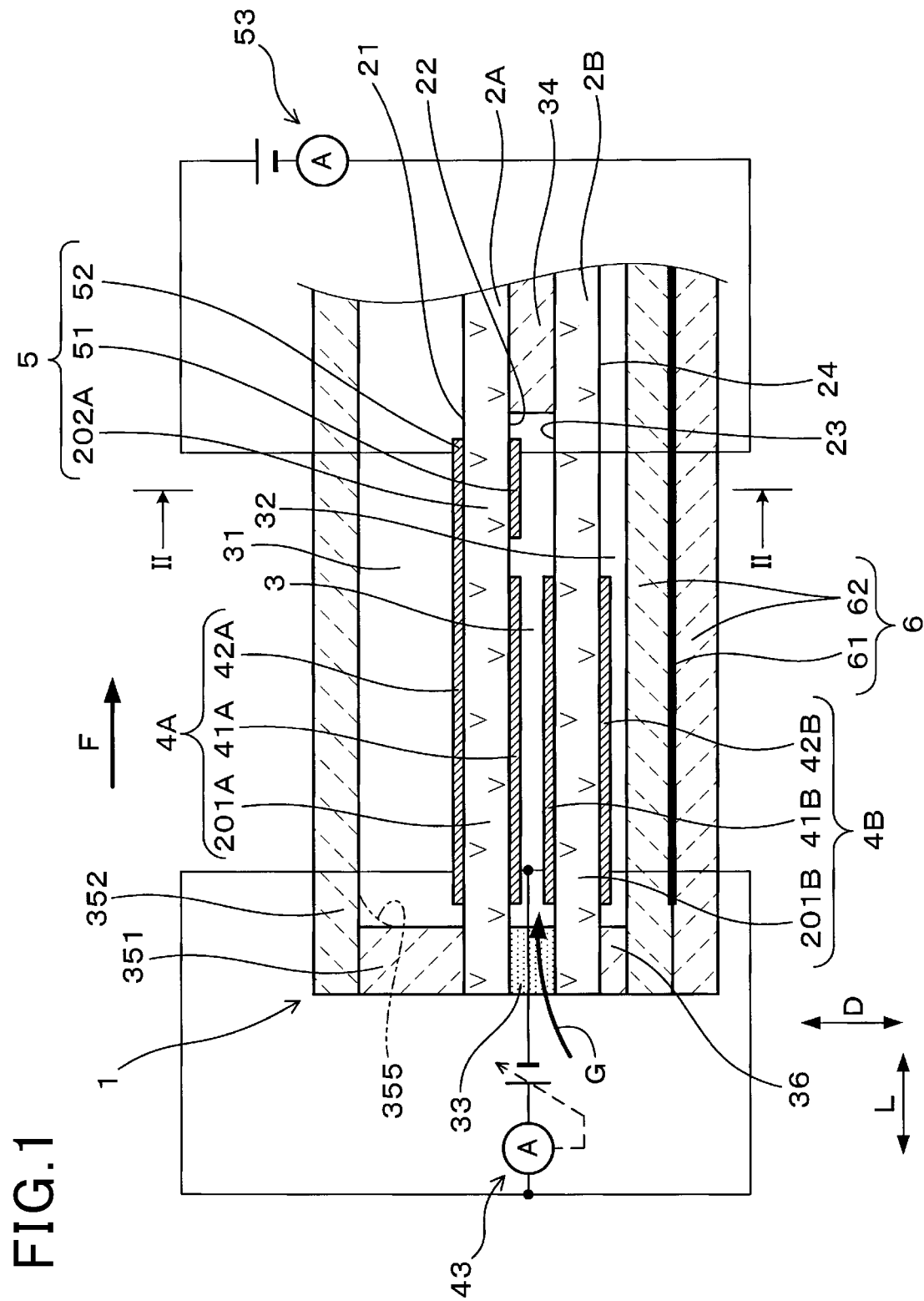
FIG. 1 is an explanatory view showing a cross section of a sensor element in a first embodiment.

The gas sensor 10 of the present embodiment includes a sensor element 1 for measuring concentration of a specific gas component in measured gas G containing oxygen. As shown in FIG. 1, the sensor element 1 includes a first solid electrolyte body 2A and a second solid electrolyte body 2B having oxygen ion conductivity, a measured gas chamber 3 into which the measured gas G is introduced, a first reference gas chamber 31 and a second reference gas chamber 32 into which reference gas A is introduced, a first pump cell 4A provided in the first solid electrolyte body 2A, a second pump cell 4B provided in the second solid electrolyte body 2B, a sensor cell 5 provided in the first solid electrolyte body 2A, and a heater 6 for heating the first solid electrolyte body 2A and the second solid electrolyte body 2B.

The first solid electrolyte body 2A is disposed between the first reference gas chamber 31 and the measured gas chamber 3. The first solid electrolyte body 2A has a first principal surface 21 facing the first reference gas chamber 31 and a second principal surface 22 facing the measured gas chamber 3. The second solid electrolyte body 2B is disposed to face the first solid electrolyte body 2A via the measured gas chamber 3. The second solid electrolyte body 2B has a first principal surface 23 facing the measured gas chamber 3 and a second principal surface 24 facing the second reference gas chamber 32.

As shown in FIG. 1, the first pump cell 4A includes a first reference electrode 42A formed on the first principal surface 21 of the first solid electrolyte body 2A, a first pump electrode 41A formed on the second principal surface 22 of the first solid electrolyte body 2A, and a part 201A of the first solid electrolyte body sandwiched between the first reference electrode 42A and the first pump electrode 41A. The first pump cell 4A is used to adjust oxygen concentration in the measured gas chamber 3 by passing current between the first reference electrode 42A and the first pump electrode 41A.

The second pump cell 4B includes a second pump electrode 41B formed at a position facing the first pump electrode 41A on the first principal surface 23 of the second solid electrolyte body 2B, a second reference electrode 42B formed on the second principal surface 24 of the second solid electrolyte body 2B, and a part 201B of the second solid electrolyte body sandwiched between the second pump electrode 41B and the second reference electrode 42B. The second pump cell 4B is used to adjust oxygen concentration in the measured gas chamber 3 by passing current between the second reference electrode 42B and the second pump electrode 41B.

Figure 2:
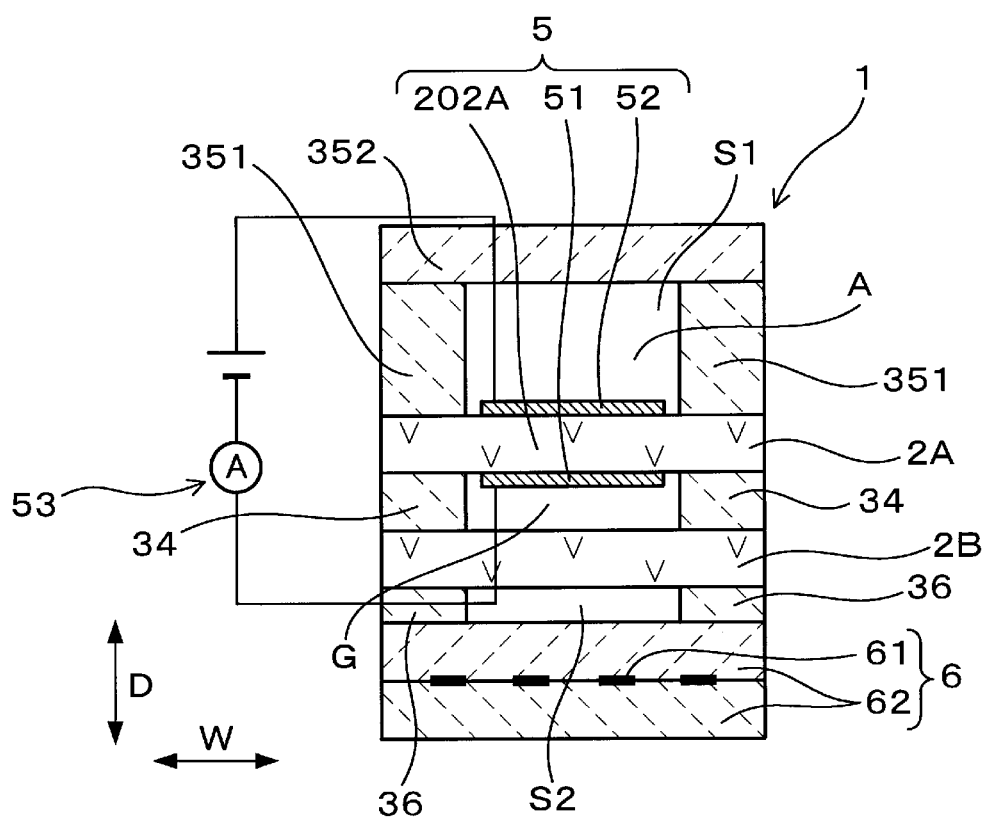
FIG. 2 is a cross-sectional view taken along line II-II in FIG. 1.

As shown in FIGS. 1 and 2, the sensor cell 5 includes a third reference electrode 52 formed on the first principal surface 21 of the first solid electrolyte body 2A, a sensor electrode 51 formed further downstream to the first pump cell 4A in the flow direction F of the measured gas G, on the second principal surface 22 of the first solid electrolyte body 2A, and a part 202A of the first solid electrolyte body 2A sandwiched between the third reference electrode 52 and the sensor electrode 51. The sensor cell 5 is used to measure concentration of the specific gas component in the measured gas G after oxygen concentration is adjusted by each of the pump cells 4A and 4B based on the current flowing between the third reference electrode 52 and the sensor electrode 51. The heater 6 is disposed to face the second principal surface 24 of the second solid electrolyte body 2B.

Figure 3:
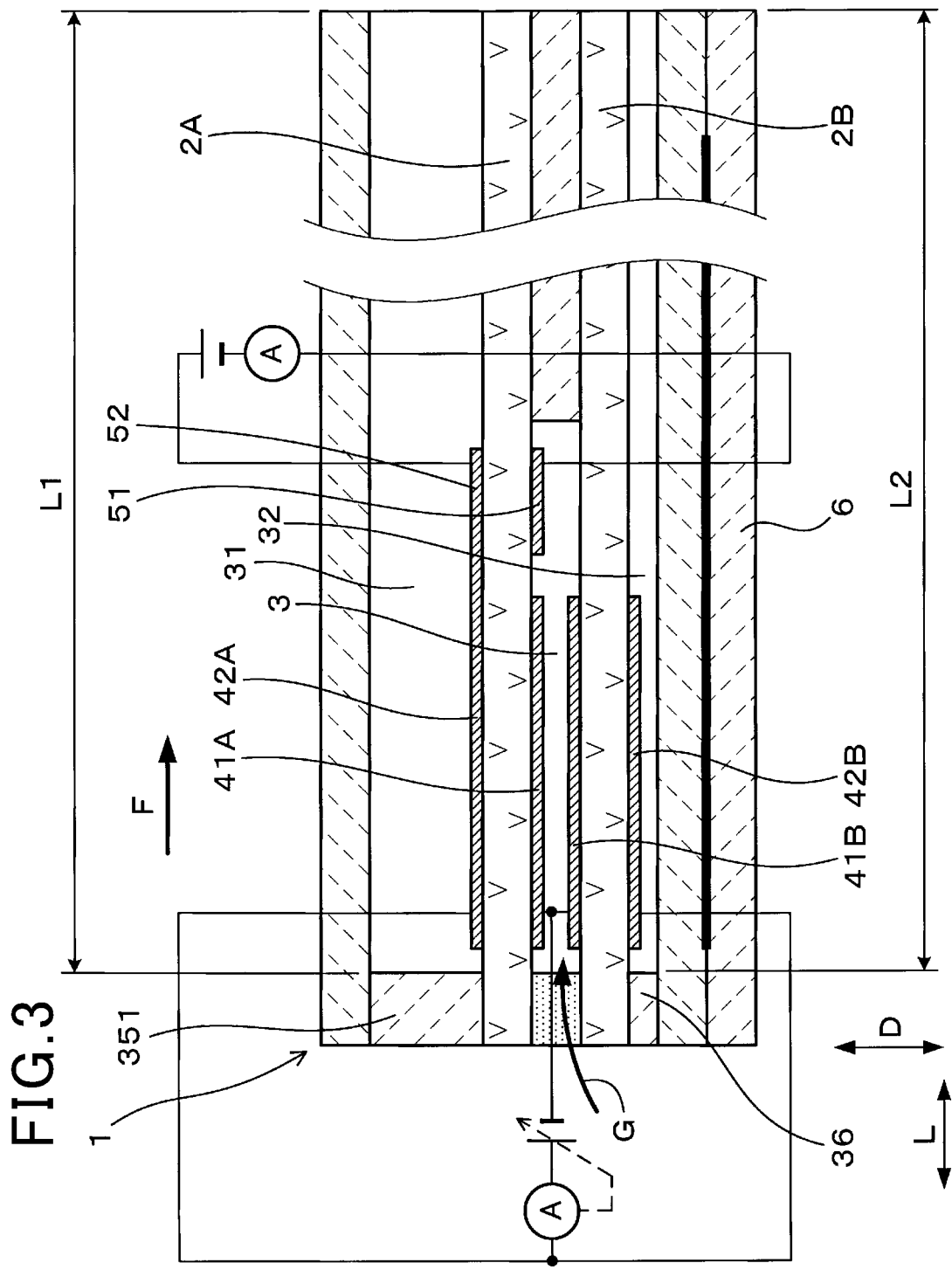
FIG. 3 is an explanatory view showing a cross section of a sensor element in the first embodiment.

As shown in FIGS. 2 and 3, a value obtained by dividing a first average cross-sectional area S1 orthogonal to the flow direction F in the first reference gas chamber 31 by a first length L1 of the flow direction F in the first reference gas chamber 31 is defined as S1/L1. A value obtained by dividing the second average cross-sectional area S2 orthogonal to the flow direction F in the second reference gas chamber 32 by the second length L2 of the flow direction F in the second reference gas chamber 32 is defined as S2/L2. At this time, S1/L1 is larger than S2/L2.

Next, the gas sensor 10 of the present embodiment will be described in further detail.

Figure 5:
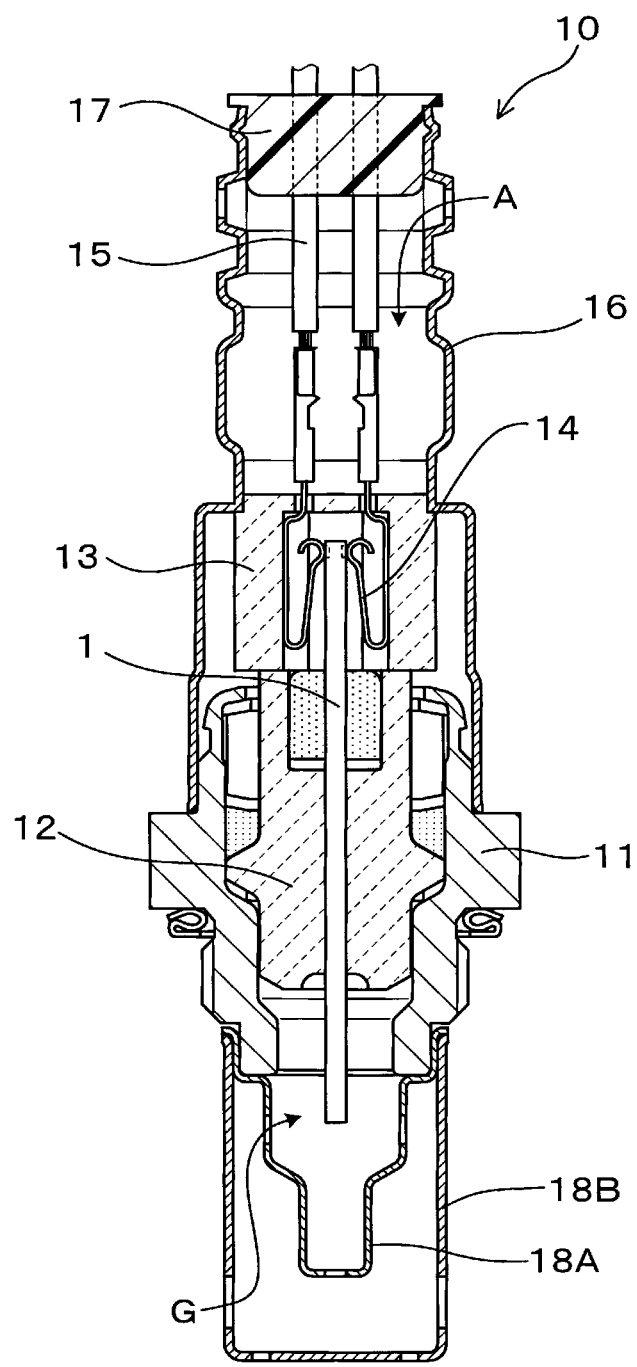
FIG. 5 is a cross-sectional view of a gas sensor including a sensor element in the first embodiment.

As shown in FIG. 5, the gas sensor 10 is disposed and used in an exhaust passage of an internal combustion engine in a vehicle, and measures concentration of NOx (nitrogen oxides) as specific gas contained in the exhaust gas using the exhaust gas flowing through the exhaust passage as the measured gas G and using the atmosphere having a constant oxygen concentration as the reference gas A.

The gas sensor 10 includes the sensor element 1, the housing 11, insulators 12 and 13, a contact terminal 14, a lead wire 15, a cover 16, a bush 17, double covers 18A and 18B, and the like.

The sensor element 1 is held by the insulator 12, and the insulator 12 is held by the housing 11. The gas sensor 10 is attached to the exhaust passage by a housing 11, and the tip end portion of the sensor element 1 is disposed in the exhaust passage. Additionally, the double covers 18A and 18B, which cover the tip end portion of the sensor element 1 are attached to the housing 11.

On the base end side of the insulator 12, another insulator, i.e., the insulator 13 which holds a contact terminal 14 is provided. A lead part of each of the electrodes 41A, 41B, 42A, 42B, 51, and 52 and a lead part of a heating element 61 of the heater 6 are drawn to the base end portion of the sensor element 1 and are connected to the contact terminal 14. The lead wire 15 connected to the contact terminal 14 is held by the bush 17 inside the cover 16 attached on a base end side of the housing 11.

Figure 4:
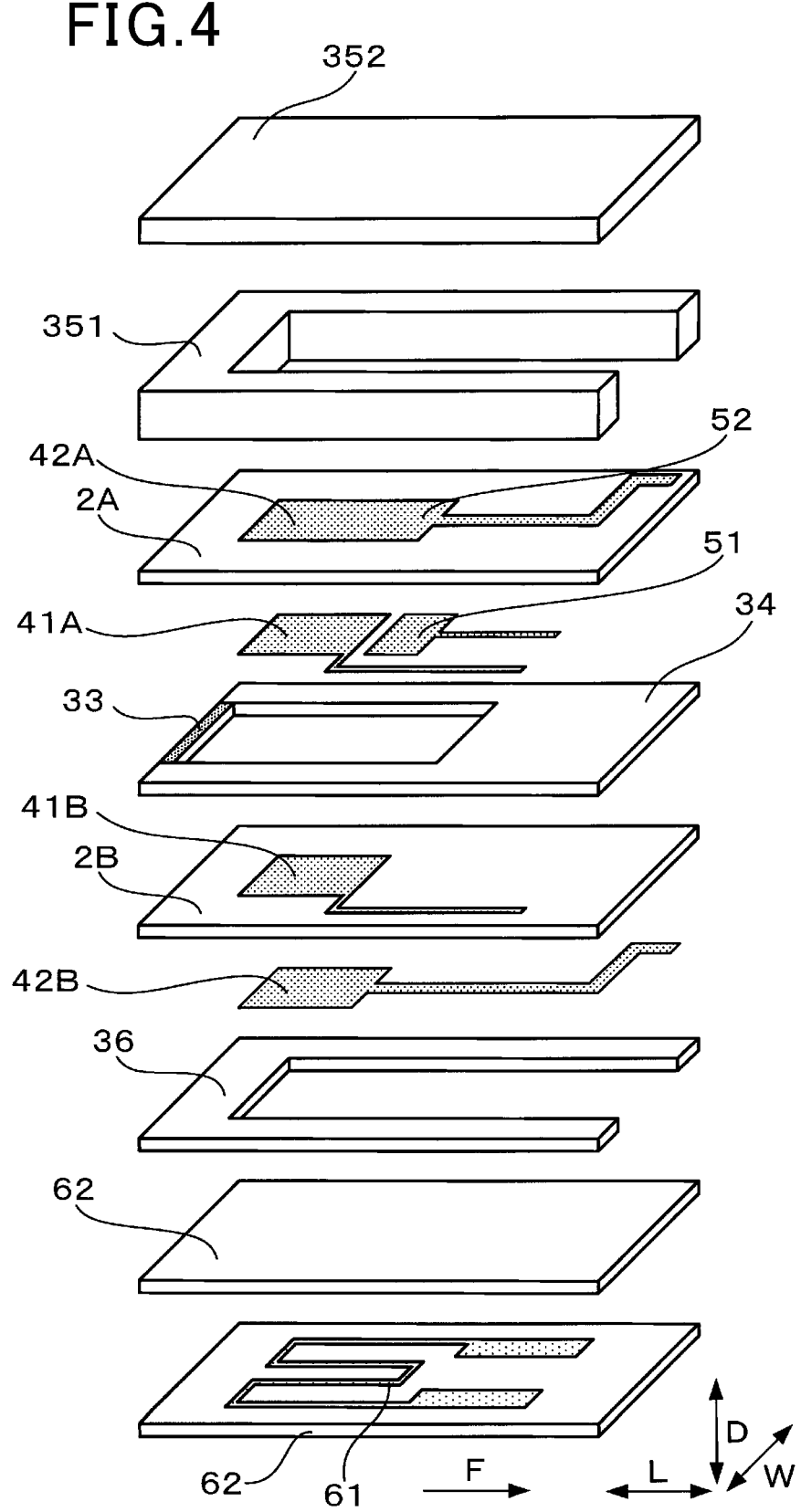
FIG. 4 is an exploded perspective view schematically showing a sensor element in the first embodiment.

As shown in FIGS. 1 and 4, the solid electrolyte bodies 2A and 2B are formed of plate-shaped yttria stabilized zirconia. The measured gas chamber 3 is formed so as to be sandwiched between the second principal surface 22 of the first solid electrolyte body 2A and the first principal surface 23 of the second solid electrolyte body 2B, and the pump electrodes 41A, 41B and the sensor electrode 51 are disposed in the measured gas chamber 3. The measured gas chamber 3 is surrounded by a diffusion resistance layer 33 through which the measured gas G passes at a predetermined diffusion rate and an insulator 34 made of ceramics such as alumina or the like. The diffusion resistance layer 33 is formed of porous ceramics. The measured gas G passes through the diffusion resistance layer 33 and is introduced into the measured gas chamber 3. The insulator 34 has a notch for forming the measuring gas chamber 3.

The sensor element 1 is formed in an elongated shape, and the diffusion resistance layer 33 is provided at the tip end portion of the elongated sensor element 1. The measured gas G is introduced into the measured gas chamber 3 from the diffusion resistance layer 33 at the tip end portion of the sensor element 1, and flows into the measured gas chamber 3 along a longitudinal direction L of the elongated sensor element 1. The flow direction F is a direction from the tip end side to the base end side along the longitudinal direction L of the elongated sensor element 1.

The first reference gas chamber 31 into which the reference gas A is introduced is formed adjacent to the first principal surface 21 of the first solid electrolyte body 2A, and the first reference electrode 42A and the third reference electrode 52 are disposed in the first reference gas chamber 31. The first reference gas chamber 31 is surrounded by insulators 351 and 352 made of ceramics such as alumina or the like. The insulator 351 has a notch for forming the first reference gas chamber 31. The second reference gas chamber 32 into which the reference gas A is introduced is formed adjacent to the second principal surface 24 of the second solid electrolyte body 2B, and the second reference electrode 42B is disposed in the second reference gas chamber 32. The second reference gas chamber 32 is surrounded by the heater 6 and an insulator 36 made of ceramics such as alumina or the like. The insulator 36 has a notch for forming the second reference gas chamber 32.

As shown in FIG. 1, a voltage application circuit 43 is connected to the first pump cell 4A and the second pump cell 4B. The voltage application circuit 43 applies a voltage between the first pump electrode 41A and the first reference electrode 42A and between the second pump electrode 41B and the second reference electrode 42B. The voltage application circuit 43 is provided in a control unit (SCU) of the gas sensor 10. The SCU is operated according to commands from a control unit (ECU) of the internal combustion engine. When the voltage application circuit 43 applies a voltage between the pump electrode 41A and the reference electrode 42A and between the pump electrode 41B and the reference electrode 42B, oxygen in the measured gas G which comes into contact with the pump electrodes 41A and 41B, is decomposed, and oxygen ions are transmitted to the reference electrodes 42A and 42B through the solid electrolyte bodies 2A and 2B, respectively, so that the oxygen in the measured gas G in the measured gas chamber 3 is removed.

Figure 6:
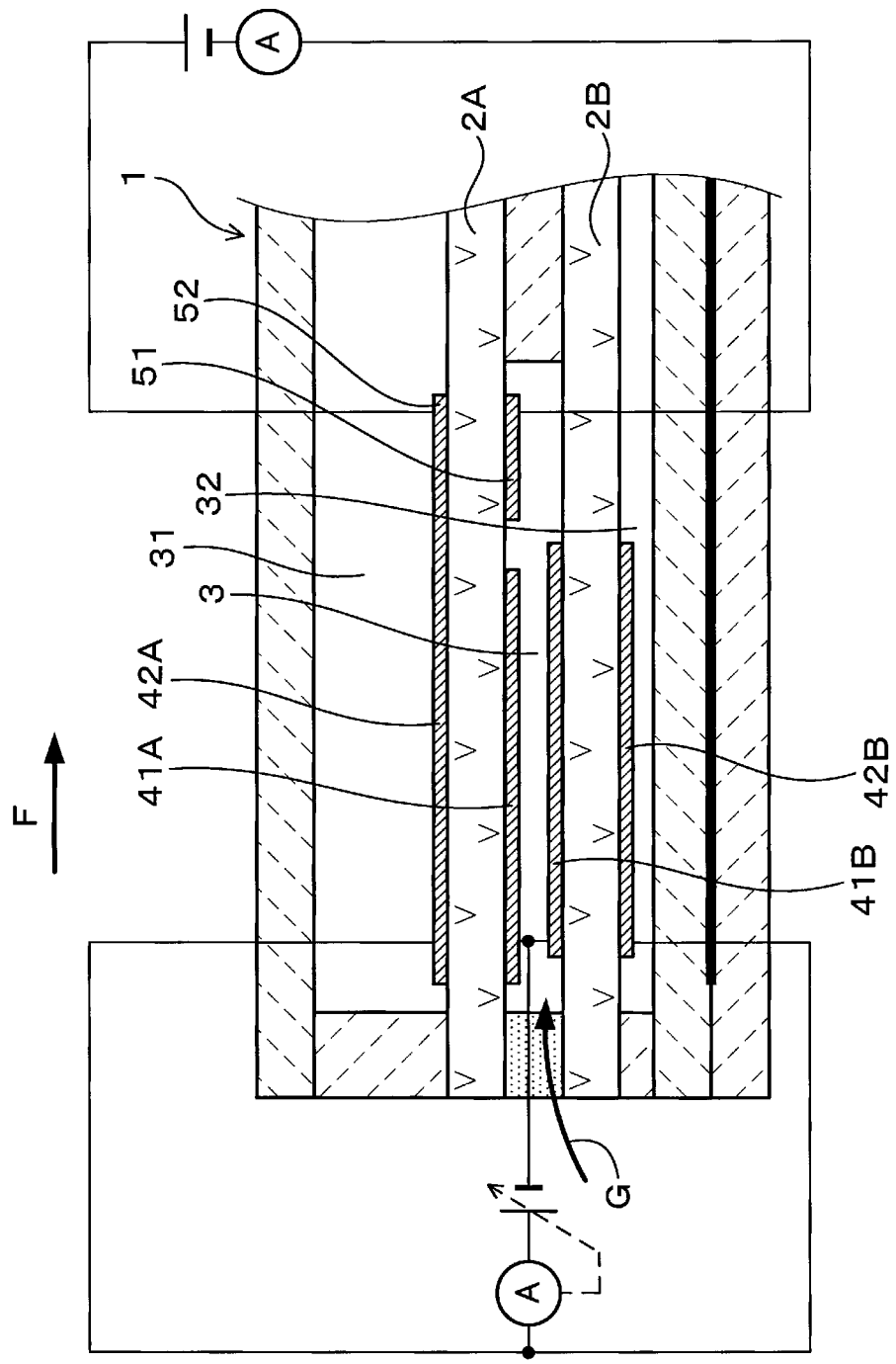
FIG. 6 is an explanatory view showing a cross section of another sensor element in the first embodiment.
Figure 7:
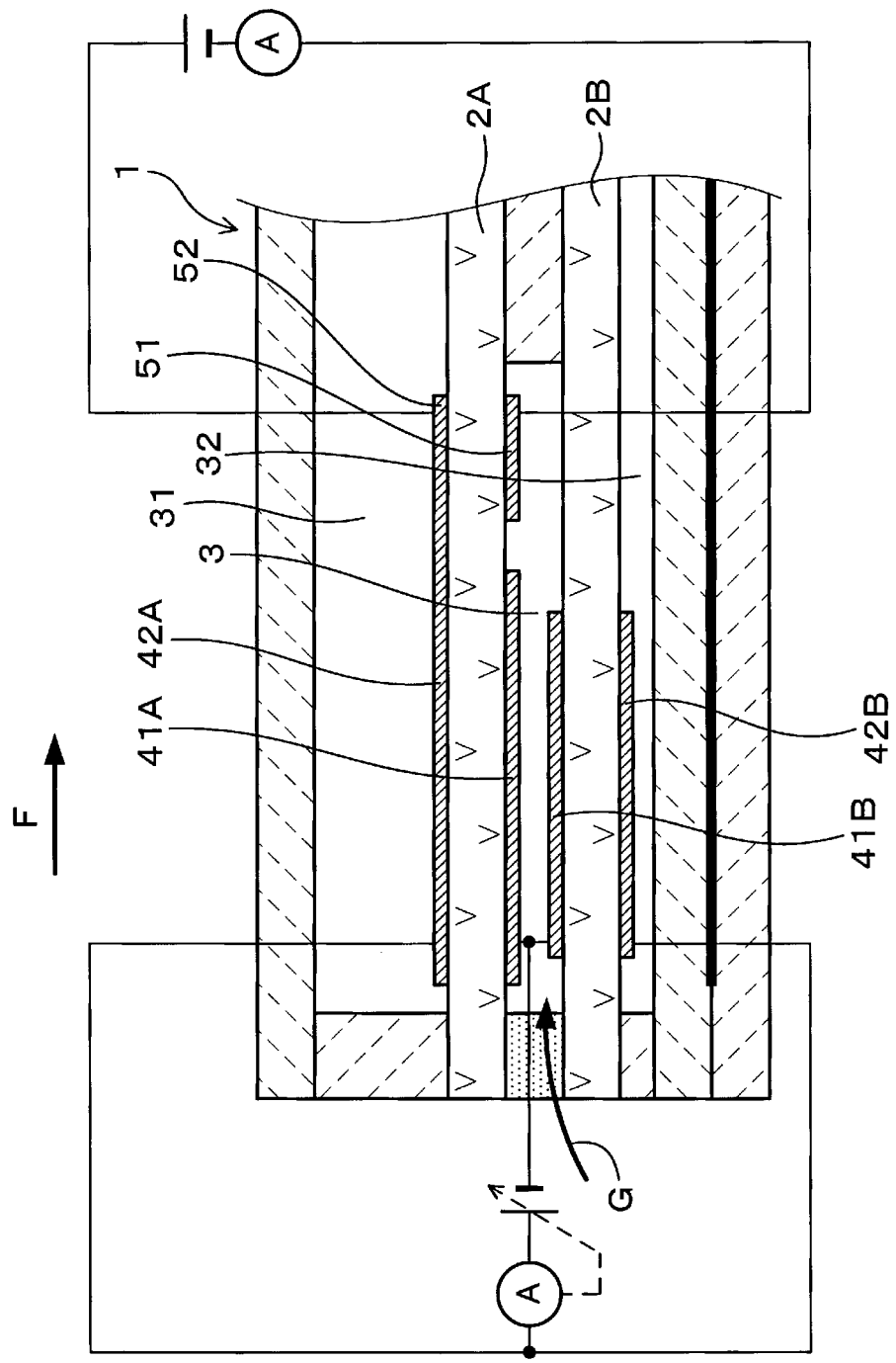
FIG. 7 is an explanatory view showing a cross section of another sensor element in the first embodiment.

According to the present embodiment, the first pump electrode 41A and the second pump electrode 41B have the same size and are arranged at the same position in the flow direction F. Alternatively, for example, as shown in FIG. 6, the position in the flow direction F of the first pump electrode 41A and the position in the flow direction F of the second pump electrode 41B may be different from each other. Further, for example, as shown in FIG. 7, the first pump electrode 41A and the second pump electrode 41B may have different sizes.

As shown in FIGS. 1 and 2, a current detection circuit 53 is connected to the sensor cell 5 to detect a current flowing between the electrodes 51 and 52 in a state in which a predetermined voltage is applied between the sensor electrode 51 and the third reference electrode 52. When the specific gas component in the measured gas G contacting the sensor electrode 51 is decomposed, oxygen ions permeate from the sensor electrode 51 to the third reference electrode 52 via the first solid electrolyte body 2A, and the current due to the oxygen ions is detected by the current detection circuit 53.

Figure 8:
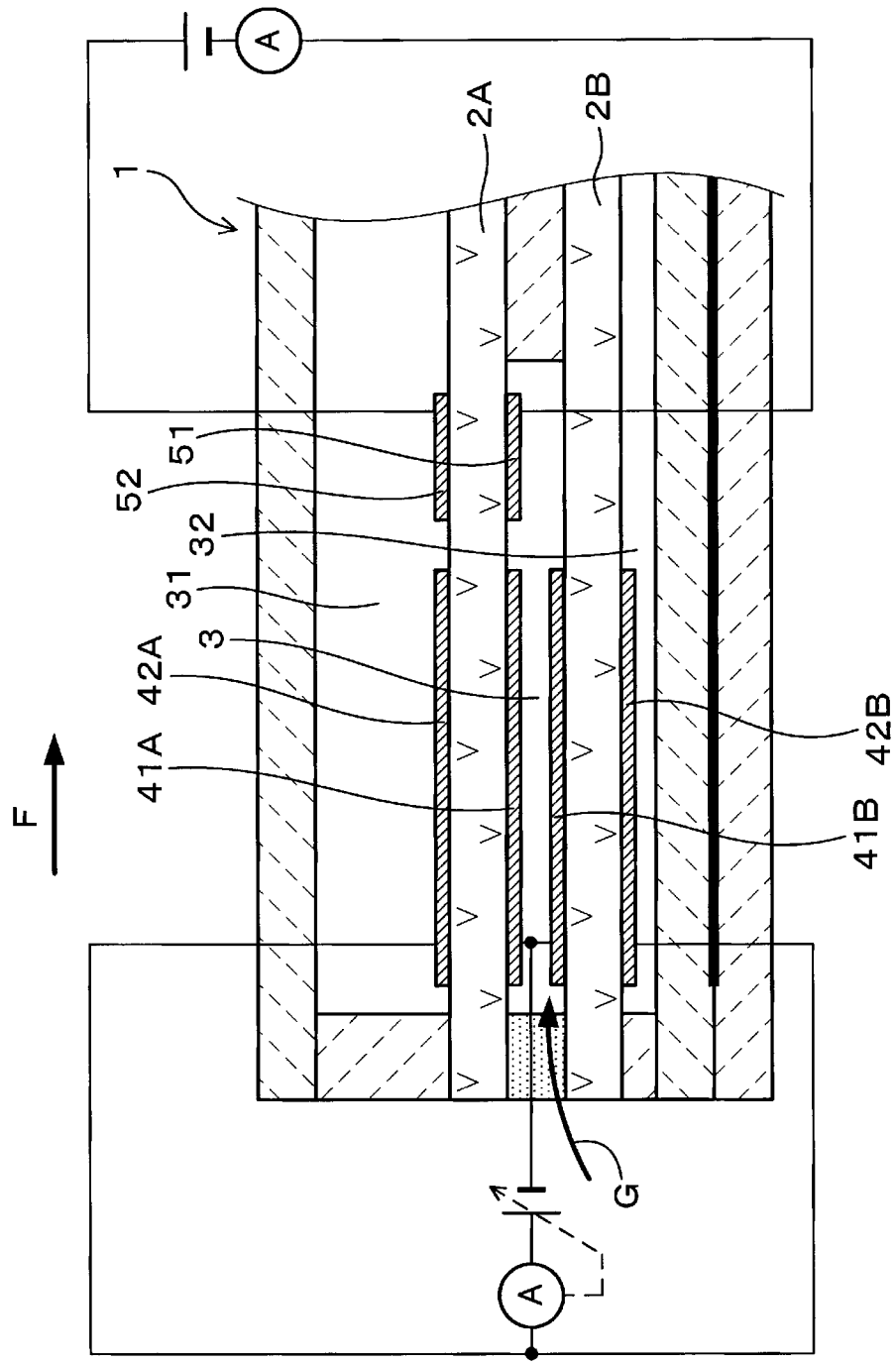
FIG. 8 is an explanatory view showing a cross section of another sensor element in the first embodiment.

The third reference electrode 52 of the present embodiment is integrated with the first reference electrode 42A of the first pump cell 4A. As shown in FIG. 8, the third reference electrode 52 may be formed separately from the first reference electrode 42A at a position facing the sensor electrode 51 with the first solid electrolyte body 2A interposed therebetween.

As shown in FIGS. 1 and 4, the heater 6 is constituted by a heating element 61 which generates heat by energization and a ceramic substrate 62 in which the heating element 61 is embedded. When a voltage is applied to the heating element 61 of the heater 6, the heating element 61 generates heat, and the sensor element 1 is heated. When the gas sensor 10 is started, the solid electrolyte bodies 2A and 2B, the pump cells 4A and 4B, and the sensor cell 5 are activated by heating provided by the heater 6. When the gas sensor 10 is used, the heater 6 controls the temperature of the sensor element 1. The voltage applied to the heating element 61 of the heater 6 is adjusted to maintain the temperature of the sensor element 1 at a predetermined target temperature.

As shown in FIGS. 3 and 4, the first reference gas chamber 31 of the present embodiment is formed in a state in which the upstream end of the flow direction F of the measured gas G is closed by the insulator 351, and the downstream end in the flow direction F is opened. The second reference gas chamber 32 is formed in a state in which the upstream end of the flow direction F of the measured gas G is closed by the insulator 36, and the downstream end in the flow direction F is opened.

The first length L1 of the first reference gas chamber 31 of the present embodiment is the length in the flow direction F of the notch formed in the insulator 351, that is, the length from the inner end surface of the insulator 351 in the longitudinal direction L to the base end of the insulator 351 (or the sensor element 1). The second length L2 of the second reference gas chamber 32 of the present embodiment is the length in the flow direction F of the notch formed in the insulator 36, that is, the length from the inner end surface of the insulator 36 in the longitudinal direction L to the base end of the insulator 36 (or the sensor element 1). The first reference gas chamber 31 and the second reference gas chamber 32 of the present embodiment are formed linearly along the longitudinal direction L, and the first length L1 and the second length L2 are the same.

The base end portion of at least one of the first reference gas chamber 31 and the second reference gas chamber 32, for example, may not be formed to the base end of the sensor element 1, but may be opened laterally at an intermediate portion in the longitudinal direction L of the sensor element 1. In this case, one of the first length L1 and the second length L2 may be shorter than the other.

The reason why the first average cross-sectional area S1 is divided by the first length L1 and the second average cross-sectional area S2 2 is divided by the second length L2 is that, as the lengths L1 and L2 become longer, the resistance (or loss) against the reference gas A flowing into the reference gas chambers 31 and 32 becomes larger. Accordingly, the value S1/L1 obtained by dividing the first average cross-sectional area S1 by the first length L1 and the value S2/L2 obtained by dividing the second average cross-sectional area S2 by the second length L2 are compared in consideration of the case where the first length L1 and the second length L2 are different, instead of directly comparing the first average cross-sectional area S1 and the second average cross-sectional area S2.

As shown in FIG. 2, the first average cross-sectional area S1 of the first reference gas chamber 31 is an average value of a value obtained by a product of the distance in a stacking direction D between the first principal surface 21 of the first solid electrolyte body 2A and the inner surface of the insulator 352, and the distance in a width direction W of the notch in the insulator 351, without considering the thickness of the first reference electrode 42A. The second average cross-sectional area S2 of the second reference gas chamber 32 is an average value of a value obtained by a product of the distance in the stacking direction D between the second principal surface 24 of the second solid electrolyte body 2B and the inner surface of the ceramic substrate 62 and the distance in the width direction W of the notch in the insulator 36, without considering the thickness of the second reference electrode 42B.

Here, the stacking direction D is a direction in which the solid electrolyte bodies 2A and 2B and the insulators 34, 351, 352, and 36 are stacked. The width direction W means a direction orthogonal to the longitudinal direction L (or the flow direction F of the measured gas G) and the stacking direction D.

The distance in the stacking direction D between the first principal surface 21 of the first solid electrolyte body 2A and the inner surface of the insulator 352, and the distance in the width direction W of the notch in the insulator 351 are made constant, respectively. The distance in the stacking direction D between the second principal surface 24 of the second solid electrolyte body 2B and the inner surface of the ceramic substrate 62, and the distance in the width direction W of the notch in the insulator 36 are made constant, respectively.

The cross-sectional areas of the first reference gas chamber 31 and the second reference gas chamber 32 orthogonal to the flow direction F are preferably constant, but are not necessarily constant depending on the manufacturing method of the sensor element 1. For example, as indicated by a two-dot chain line in FIG. 1, a curved corner portion 355 may be formed on an inner wall that constitutes an upstream end portion of the flow direction F, in the first reference gas chamber 31. The curved corner portion 355 may be a portion formed when a portion corresponding to the first reference gas chamber 31 is removed by a tool or the like when a ceramic sheet in which the insulator 351 and the insulator 352 are integrated is used.

In the sensor element 1 of the present embodiment, the value S1/L1 in the first reference gas chamber 31 is 2.6 times or more and 70 times or less than the value S2/L2 in the second reference gas chamber 32. The sum of S1/L1 and S2/L2 is 0.006 mm or more.

The first length L1 of the first reference gas chamber 31 and the second length L2 of the second reference gas chamber 32 are preferably 80 mm or less in order to further promote the supply of the reference gas A to the reference electrodes 42A, 42B and 52.

Next, the operation and effect of the present embodiment will be described.

In the sensor element 1 of the gas sensor 10 of the present embodiment, the value S1/L1 in the first reference gas chamber 31 facing the first principal surface 21 of the first solid electrolyte body 2A provided with the sensor cell 5 is larger than the value S2/L2 in the second reference gas chamber 32 facing the second principal surface 24 of the second solid electrolyte body 2B. Here, the values S1/L1 and S2/L2 are scales indicating the ease of introducing the reference gas A into the reference gas chambers 31 and 32. The values S1/L1 and S2/L2 become larger as the average cross-sectional areas S1 and S2 of the reference gas chambers 31 and 32 become larger, and become smaller as the lengths L1 and L2 of the reference gas chambers 31 and 32 become longer. The larger the values S1/L1 and S2/L2, the easier it is to introduce the reference gas A into the reference gas chambers 31 and 32.

With the configuration of the sensor element 1, when a so-called rich gas is introduced into the measured gas chamber 3 as the measured gas G, it is possible to prevent a decrease in oxygen concentration in the first reference gas chamber 31 facing the first principal surface 21 of the first solid electrolyte body 2A provided with the sensor cell 5. As a result, even when the measured gas G introduced into the gas sensor 10 fluctuates between rich gas and lean gas, it is possible to suppress the fluctuation occurring in the sensor output when concentration of the specific gas component is measured by the sensor cell 5.

Here, the rich gas refers to an exhaust gas in the case where the air-fuel ratio (A/F) which is the mass ratio of air to fuel in the internal combustion engine is on the richer side than the stoichiometric air-fuel ratio indicating the ratio of air when the fuel is completely combusted (the side where the ratio of fuel is larger). Conversely, the lean gas refers to exhaust gas when the air-fuel ratio in the internal combustion engine is on the leaner side than the stoichiometric air-fuel ratio (the side where the ratio of air is larger). The exhaust gas after combustion, which is performed by the rich gas or the lean gas, is introduced into the gas sensor 10 as the measured gas G.

Figure 9:
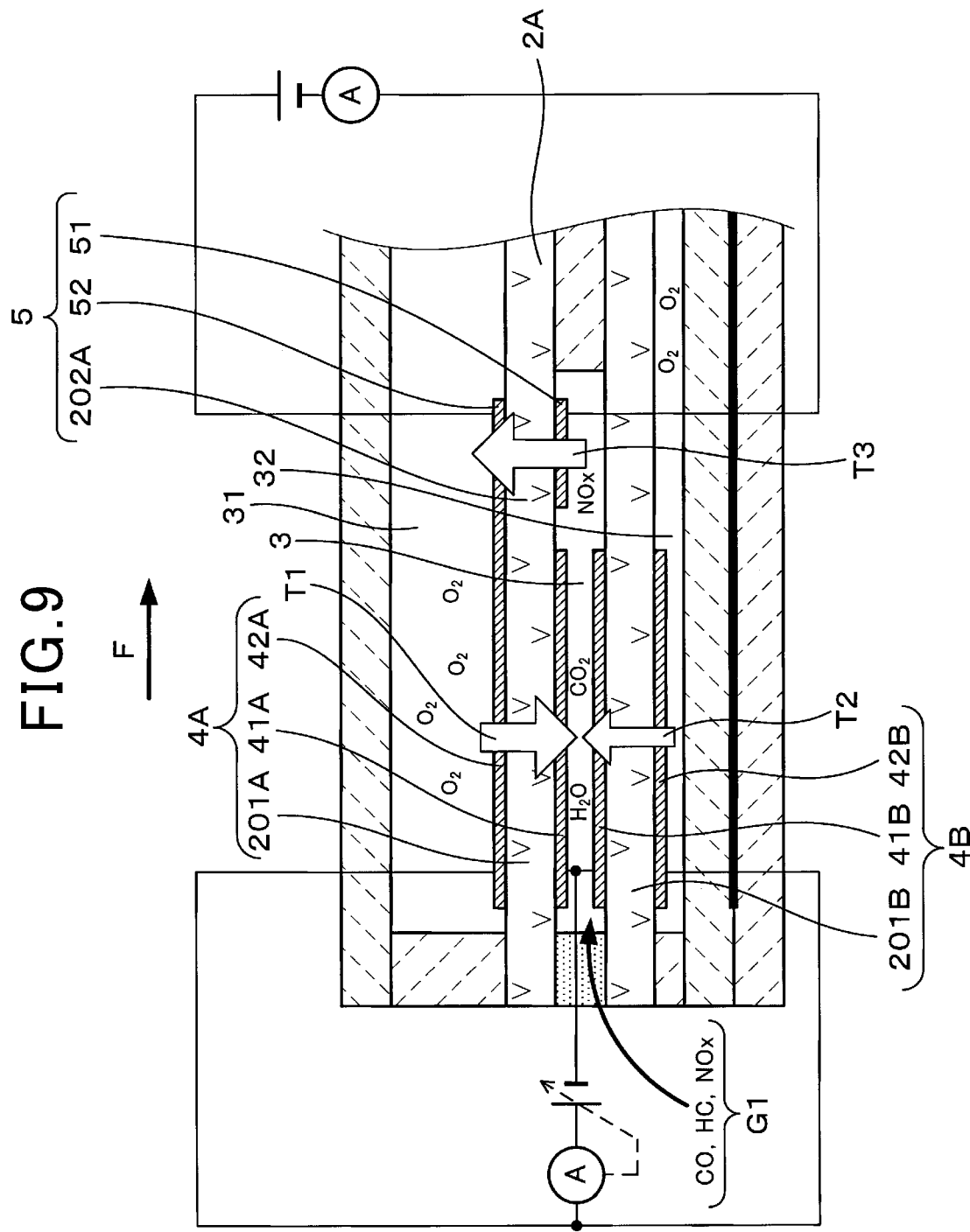
FIG. 9 is an explanatory diagram showing the operation of the pump cell and the sensor cell in the first embodiment.

The reason why the variation of the sensor output can be suppressed to be small by the configuration of the sensor element 1 is not necessarily clear, but it can be considered as follows. As shown in FIG. 9, when rich gas G1 containing CO, HC, $H_2$ or the like is introduced into the measured gas chamber 3, in order to convert CO and HC in the rich gas G1 into $CO_2$ and $H_2O$, oxygen is supplied from the first reference gas chamber 31 and the second reference gas chamber 32 to the measured gas chamber 3 by the first pump cell 4A and the second pump cell 4B as shown by arrows T1 and T2 in FIG. 9. Then, oxygen concentration in the first reference gas chamber 31 and the second reference gas chamber 32 tends to decrease. At this time, when oxygen concentration in the first reference gas chamber 31 decreases, the potential of the third reference electrode 52 fluctuates, and the sensor output fluctuates.

In the sensor cell 5, the decomposition of NOx and the electrolysis of $H_2O$ may be performed. In this case, in the first solid-state electrolyte body 2A, as indicated by an arrow T 3 in FIG. 9, oxygen ions at the time of NOx decomposition and oxygen ions at the time of $H_2O$ decomposition are conducted from the measuring gas chamber 3 to the first reference gas chamber 31. At this time, if oxygen concentration in the first reference gas chamber 31 is lowered, it is considered that the electrolysis of the $H_2O$ is promoted. Therefore, in the gas sensor 10 of the present embodiment, the value S1/L1 in the first reference gas chamber 31 is made larger than the value S2/L2 in the second reference gas chamber 32, thereby preventing a decrease in oxygen concentration in the first reference gas chamber 31. With this configuration, it is considered that the potential of the third reference electrode 52 is stabilized, the electrolysis of the $H_2O$ in the sensor cell 5 is suppressed, and the variation of the sensor output by the sensor cell 5 is kept minimized.

By dividing the pump cells 4A and 4B into the first pump cell 4A and the second pump cell 4B, the formation length of the pump cells 4A and 4B in the flow direction F is shortened. As a result, the time until the measured gas G whose oxygen concentration has been adjusted by the pump electrodes 41A and 41B of each of the pump cells 4A and 4B reaches the sensor electrode 51 of the sensor cell 5 is shortened, and the responsiveness of the measurement of the specific gas concentration in the measured gas G can be kept high.

As described above, according to the gas sensor 10, the variation of the sensor output by the sensor cell 5 can be suppressed to a small level while maintaining the high responsiveness of the measurement.

Second Embodiment

In this embodiment, another mode of the heater 6 is shown. In the present embodiment, the arrangement position of the heater 6 is different from that in the first embodiment.

Figure 10:
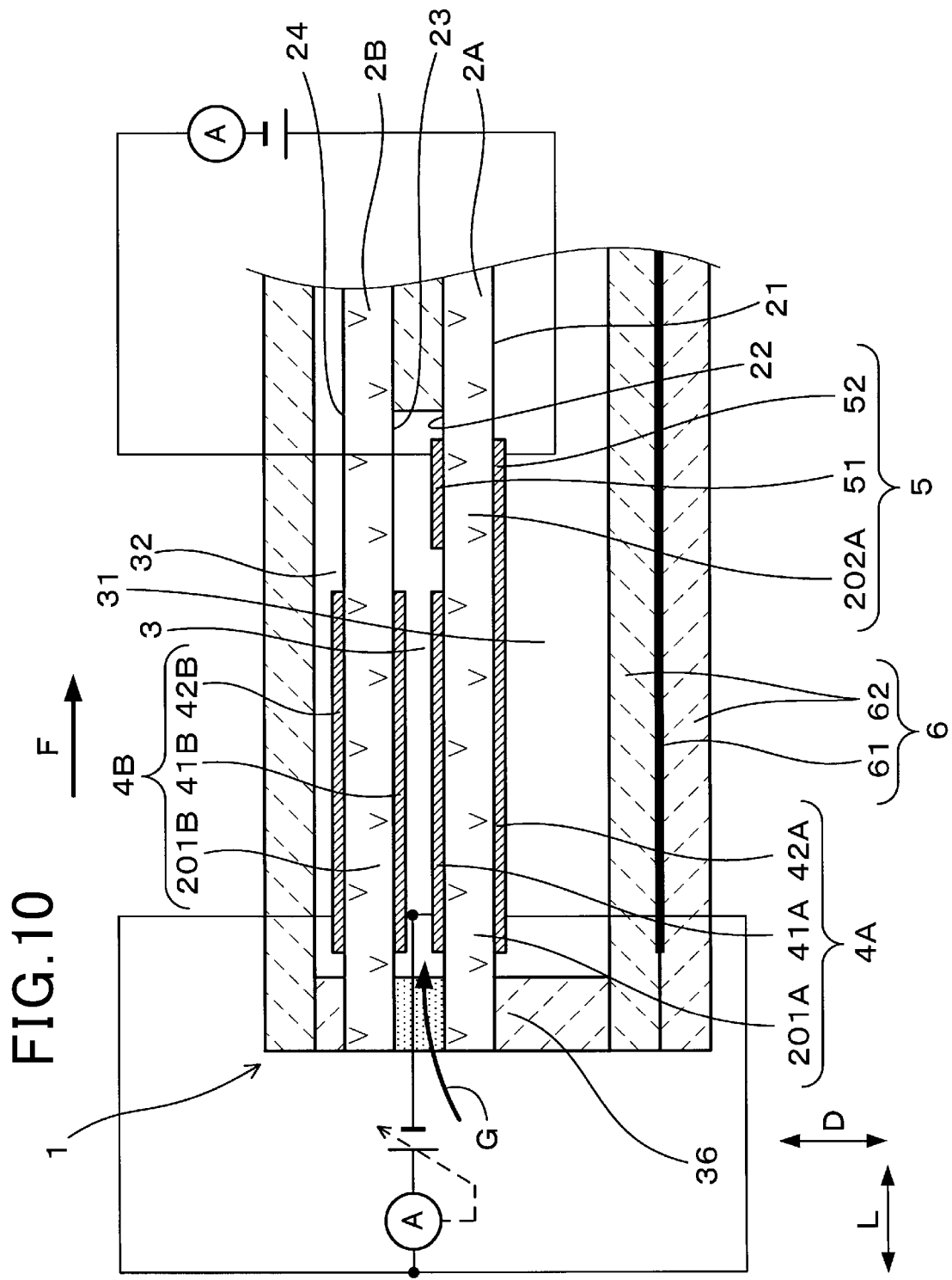
FIG. 10 is an explanatory view showing a cross section of a sensor element in a second embodiment.

As shown in FIG. 10, the heater 6 is disposed to face the first principal surface 21 of the first solid electrolyte body 2A.

Other configurations are the same as those of the first embodiment. Of the reference signs used in the second embodiment and the subsequent embodiments, the same reference signs as those in the embodiments described indicate the same components and the like as those in the embodiments, unless otherwise indicated.

The heater 6 in the gas sensor 10 of the present embodiment is disposed so as to face the first principal surface 21 of the first solid electrolyte body 2A on which the sensor cell 5 is formed. Therefore, as compared with the case of the first embodiment in which the heater 6 is disposed so as to face the second principal surface 24 of the second solid electrolyte body 2B in which the sensor cell 5 is not formed, the disposition position of the sensor cell 5 can be made closer to the disposition position of the heater 6, and heat generated when the heater 6 is operated can be quickly transferred to the sensor cell 5 at the time of starting and using the gas sensor 10. Accordingly, even when the ambient temperature of the gas sensor 10 fluctuates transiently, the temperature of the sensor cell 5 can be easily maintained within a target temperature range. As a result, the temperature fluctuation of the sensor cell 5 is prevented, and the measurement accuracy of the specific gas concentration in the measured gas G by the sensor cell 5 can be improved.

In addition, the same effects as those of the first embodiment can be obtained.

(Confirmation Test 1)

In this confirmation test, each sample of the gas sensor 10 of the first embodiment was prepared, and the deviation amount of the sensor output was measured by changing the ratio (S1/L1)/(S2/L2) of the value S1/L1 (mm) in the first reference gas chamber 31 to the value S2/L2 (mm) in the second reference gas chamber 32 for each sample. The amount of deviation of the sensor output means the deviation amount between the sensor output of each sample and the theoretical sensor output when a specific gas component in the measured gas G is measured. The deviation amount of the sensor output is kept within 0.1 µA so that the variation of the sensor output of the gas sensor 10 can be suppressed to be small. In this confirmation test, the deviation amount of the sensor output is expressed as an absolute value.

The sum S1/L1+S2/L2 of the value S1/L1 in the first reference gas chamber 31 and the value S2/L2 in the second reference gas chamber 32 in each sample was 0.008 mm. The sum S1+S2 of the first average cross-sectional area S1 of the first reference gas chamber 31 and the second average cross-sectional area S2 of the second reference gas chamber 32 was 0.36 $mm^2$, and the first length L1 of the first reference gas chamber 31 and the second length L2 of the second reference gas chamber 32 were 45 mm.

Figure 11:
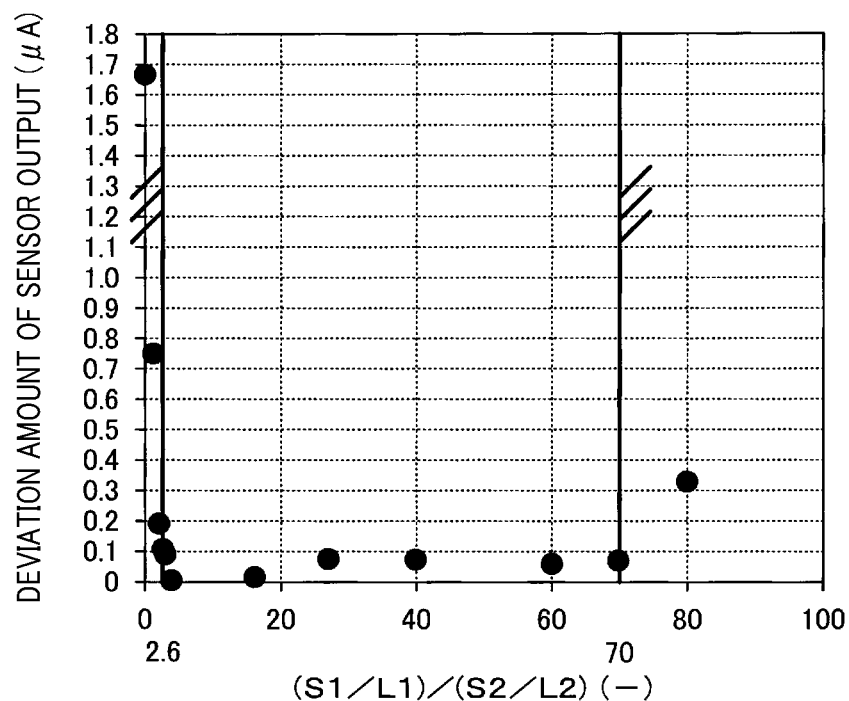
FIG. 11 is a graph showing the relationship between the ratio of a value (S1/L1) in the first reference gas chamber to a value (S2/L2) in the second reference gas chamber and the deviation amount of the sensor output in the confirmation test 1.

In this confirmation test, firstly, each sample was heated by the heater 6 until the temperature of the sensor cell 5 of each sample reached 750° C. After the temperature of the sensor cell 5 of each sample has stabilized, the measured gas G having oxygen concentration of 21%, nitrogen monoxide concentration of 400 ppm, and the remainder was nitrogen was supplied to the measured gas chamber 3 of each sample for the elapsed time of 0 to 600 seconds. Next, during the elapsed time of 600 to 1200 seconds, the measured gas G having concentration of oxygen of 0%, concentration of nitrogen monoxide of 400 ppm, concentration of carbon monoxide of 1.5%, concentration of hydrogen of 4%, and the concentration of propane of 2% was supplied to the measured gas chamber 3 of each sample. Thereafter, the measured gas G having oxygen concentration of 21%, nitrogen monoxide concentration of 400 ppm, and the remainder was nitrogen was supplied again to the measured gas chamber 3 of each sample. FIG. 11 shows the deviation amount of the sensor output of each sample when the measured gas G is changed from lean gas, rich gas, and to lean gas.

As shown in the figure, when (S1/L1)/(S2/L2) became 2.6 times or more and 70 times or less, the deviation amount of the sensor output of each sample was within the criterion of 0.1 µA. On the other hand, when (S1/L1)/(S2/L2) was less than 2.6 times, the deviation amount of the sensor output of each sample significantly exceeded the criterion of 0.1 µA. The reason for this is considered to be that the value S1/L1 in the first reference gas chamber 31 is not sufficiently larger than the value S2/L2 in the second reference gas chamber 32, so that oxygen concentration in the first reference gas chamber 31 is lowered and the electrolysis of the $H_2O$ occurs in the sensor cell 5.

Meanwhile, when (S1/L1)/(S2/L2) exceeded 70 times, the deviation amount of the sensor output of each sample exceeded the criterion of 0.1 µA. The reason for this is considered to be that the quantity of the reference gas A supplied to the second reference electrode 42B is insufficient, CO is not sufficiently converted into $CO_2$ in the second pump cell 4B, a part of CO reaches the sensor cell 5, and CO and NO react with each other in the sensor electrode 51 in the sensor cell 5. From this, it was found that (S1/L1)/(S2/L2) is preferably 2.6 times or more and 70 times or less in order to suppress the variation of the sensor output of the gas sensor 10 to be small.

(Confirmation Test 2)

Figure 12:
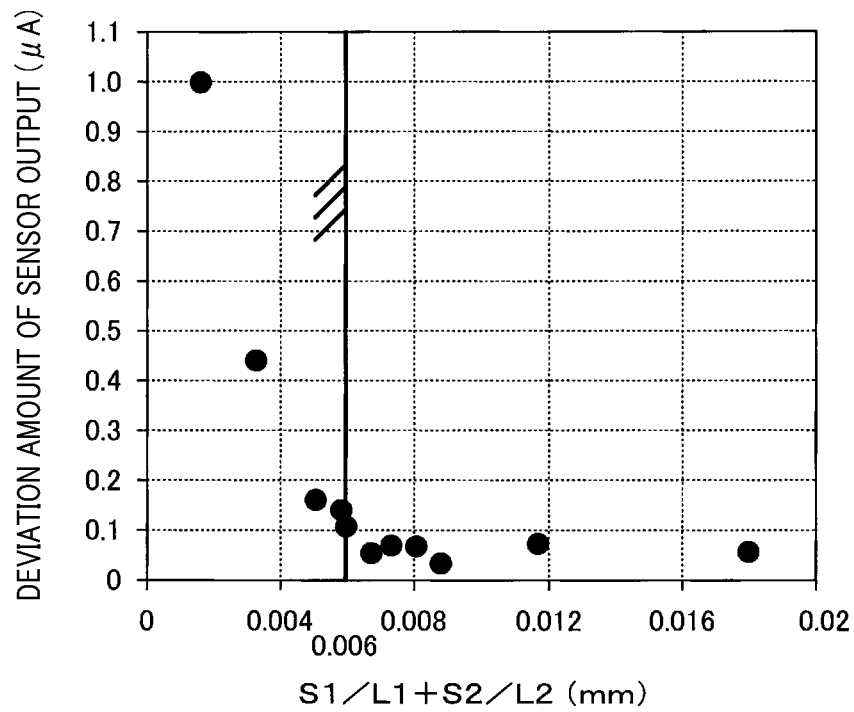
FIG. 12 is a graph showing the relationship between the sum of the value (S1/L1) and the value (S2/L2) and the deviation amount of the sensor output in a confirmation test 2.

In this confirmation test, each sample of the gas sensor 10 of the first embodiment in which the sum of the value S1/L1 in the first reference gas chamber 31 and the value S2/L2 in the second reference gas chamber 32 was varied was prepared, and the deviation amount of the sensor output for each sample was measured. (S1/L1)/(S2/L2) was 2.6 times, and the first length L1 of the first reference gas chamber 31 and the second length L2 of the second reference gas chamber 32 were 60 mm. In this confirmation test, the supply of the measured gas G to the measured gas chamber 3 was sequentially changed from lean gas, rich gas, and to lean gas in the same manner as in the case of the confirmation test 1. The deviation amount of the sensor output of each sample at this time is shown in FIG. 12.

As shown in the figure, when S1/L1+S2/L2 became 0.006 mm or more, the deviation amount of the sensor output of each sample became within the criterion of 0.1 µA. On the other hand, when S1/L1+S2/L2 became less than 0.006 mm, the deviation amount of the sensor output of each sample significantly exceeded the criterion of 0.1 µA. The reason for this is considered to be that the oxygen content in the first reference gas chamber 31 and in the second reference gas chamber 32 for converting CO in the rich gas into $CO_2$ is insufficient, and that the reaction between CO and NO at the sensor electrode 51 in the sensor cell 5. From this, it has been found that S1/L1+S2/L2 is preferably 0.006 mm or more in order to keep the variation of the sensor output of the gas sensor 10 small.

Although the disclosure has been described in accordance with embodiments, it is understood that the disclosure is not limited to such embodiments or structures. The present disclosure encompasses various modifications and variations within the range of equivalents. In addition, various combinations and forms, as well as other combinations and forms including only one element, more elements, or less elements, are included within the range and spirit of the present disclosure.

What is claimed is:

1. A gas sensor including a sensor element for measuring concentration of a specific gas component in measured gas containing oxygen, wherein;

the sensor element includes:
 a measured gas chamber into which the measured gas is introduced;
 a first reference gas chamber and a second reference gas chamber into which reference gas is introduced;
 a plate-shaped first solid electrolyte body having oxygen ion conductivity, disposed between the first reference gas chamber and the measured gas chamber, and having a first principal surface facing the first reference gas chamber, and a second principal surface facing the measured gas chamber;
 a second solid electrolyte body having oxygen ion conductivity, disposed facing the first reference gas chamber via the measured gas chamber, and having a first principal surface facing the first reference gas chamber and a second principal surface facing the second reference gas chamber;
 a first pump cell including a first reference electrode formed on the first principal surface of the first solid electrolyte body, a first pump electrode formed on the second principal surface of the first solid electrolyte body, and a part of the first solid electrolyte body sandwiched between the first reference electrode and the first pump electrode, and the first pump cell adjusting oxygen concentration in the measured gas chamber by passing current between the first reference electrode and the first pump electrode;
 a second pump cell including a second pump electrode formed on the first principal surface of the second solid electrolyte body, a second reference electrode formed on the second principal surface of the second solid electrolyte body, and a part of the second solid electrolyte body sandwiched between the second pump electrode and the second reference electrode, and the second pump cell adjusting oxygen concentration in the measured gas chamber by passing current between the second reference electrode and the second pump electrode;
 a sensor cell including a third reference electrode formed on the first principal surface of the first solid electrolyte body, a sensor electrode formed further downstream to the first pump cell in a flow direction of the measured gas on the second principal surface of the first solid electrolyte body, and a part of the first solid electrolyte body sandwiched between the third reference electrode and the sensor electrode, and the sensor cell measuring the specific gas component in measured gas whose oxygen concentration has been adjusted by each of the pump cells, based on the current passed between the third reference electrode and the sensor electrode; and
 a heater disposed facing the first principal surface of the first solid electrolyte body or the second principal surface of the second solid electrolyte body; wherein
a value (S1/L1) obtained by dividing a first cross-sectional area by a first length, the first cross-sectional area being orthogonal to the flow direction in the first reference gas chamber, the first length being in the flow direction in the first reference gas chamber, is larger throughout the first length of the first reference gas chamber and a second length of the second reference gas chamber in the flow direction than a value (S2/L2) obtained by dividing a second cross-sectional area by the second length, the second cross-sectional area being orthogonal to the flow direction in the second reference gas chamber, the second length being in the flow direction in the second reference gas chamber; and
the first length of the first reference gas chamber and the second length of the second reference gas chamber extend from an upstream end of the sensor element in the flow direction to an outer end of the sensor element opposite of the upstream end.

2. The gas sensor according to claim 1, wherein;
a width in a width direction orthogonal to the flow direction and a stacking direction in the first reference gas chamber and the second reference gas chamber is set constant throughout the first length of the first reference gas chamber and the second length of the second reference gas chamber in the flow direction.

3. The gas sensor according to claim 1, wherein;
the value (S1/L1) is 2.6 times or more and 70 times or less than the value (S2/L2).

4. The gas sensor according to claim 1, wherein;
a sum of the value (S1/L1) and the value (S2/L2) is 0.006 mm or more.

5. The gas sensor according to claim 1, wherein;
a curved corner portion is formed on an inner wall that constitutes an upstream end portion in the flow direction, in the first reference gas chamber.

6. The gas sensor according to claim 1, wherein;
the first solid electrolyte body and the second solid electrolyte body are stacked in a stacking direction; and
in the stacking direction, a first thickness of the first reference gas chamber at the upstream end in the first reference gas chamber in the flow direction is larger than a second thickness of the second reference gas chamber at the upstream end in the second reference gas chamber in the flow direction.

7. A gas sensor including a sensor element for measuring concentration of a specific gas component in measured gas containing oxygen, wherein;
the sensor element includes:
a measured gas chamber into which the measured gas is introduced;
a first reference gas chamber and a second reference gas chamber into which reference gas is introduced;
a plate-shaped first solid electrolyte body having oxygen ion conductivity, disposed between the first reference gas chamber and the measured gas chamber, and having a first principal surface facing the first reference gas chamber, and a second principal surface facing the measured gas chamber;
a second solid electrolyte body having oxygen ion conductivity, disposed facing the first reference gas chamber via the measured gas chamber, and having a first principal surface facing the first reference gas chamber and a second principal surface facing the second reference gas chamber;
a first pump cell including a first reference electrode formed on the first principal surface of the first solid electrolyte body, a first pump electrode formed on the second principal surface of the first solid electrolyte body, and a part of the first solid electrolyte body sandwiched between the first reference electrode and the first pump electrode, and the first pump cell adjusting oxygen concentration in the measured gas chamber by passing current between the first reference electrode and the first pump electrode;
a second pump cell including a second pump electrode formed on the first principal surface of the second solid electrolyte body, a second reference electrode formed on the second principal surface of the second solid electrolyte body, and a part of the second solid electrolyte body sandwiched between the second pump electrode and the second reference electrode, and the second pump cell adjusting oxygen concentration in the measured gas chamber by passing current between the second reference electrode and the second pump electrode;
a sensor cell including a third reference electrode formed on the first principal surface of the first solid electrolyte body, a sensor electrode formed further downstream to the first pump cell in a flow direction of the measured gas on the second principal surface of the first solid electrolyte body, and a part of the first solid electrolyte body sandwiched between the third reference electrode and the sensor electrode, and the sensor cell measuring the specific gas component in measured gas whose oxygen concentration has been adjusted by each of the pump cells, based on the current passed between the third reference electrode and the sensor electrode; and
a heater disposed facing the first principal surface of the first solid electrolyte body or the second principal surface of the second solid electrolyte body; wherein
a value (S1/L1) obtained by dividing a first average cross-sectional area by a first length, the first average cross-sectional area being orthogonal to the flow direction in the first reference gas chamber, the first length being in the flow direction in the first reference gas chamber, is larger than a value (S2/L2) obtained by dividing a second average cross-sectional area by a second length, the second average cross-sectional area being orthogonal to the flow direction in the second reference gas chamber, the second length being in the flow direction in the second reference gas chamber;
the first solid electrolyte body and the second solid electrolyte body are stacked in a stacking direction;
in the stacking direction, a first thickness of the first reference gas chamber is larger than a second thickness of the second reference gas chamber throughout the first length in the flow direction in the first reference gas chamber and the second length in the flow direction in the second reference gas chamber; and
the first length of the first reference gas chamber and the second length of the second reference gas chamber extend from an upstream end of the sensor element in the flow direction to an outer end of the sensor element opposite of the upstream end.

8. The gas sensor according to claim 7, wherein;
a width in a width direction orthogonal to the flow direction and the stacking direction in the first reference gas chamber and the second reference gas chamber is set constant throughout the first length of the first reference gas chamber and the second length of the second reference gas chamber in the flow direction.

9. The gas sensor according to claim 7, wherein;
the value (S1/L1) is 2.6 times or more and 70 times or less than the value (S2/L2).

10. The gas sensor according to claim 7, wherein;
a sum of the value (S1/L1) and the value (S2/L2) is 0.006 mm or more.

11. The gas sensor according to claim 7, wherein;
a curved corner portion is formed on an inner wall that constitutes an upstream end portion in the flow direction, in the first reference gas chamber.

12. The gas sensor according to claim 7, wherein;
in the stacking direction, the first thickness of the first reference gas chamber at the upstream end in the first reference gas chamber in the flow direction is larger than the second thickness of the second reference gas chamber at the upstream end in the second reference gas chamber in the flow direction.

* * * * *